US 8,588,737 B2

(12) United States Patent
Amato et al.

(10) Patent No.: US 8,588,737 B2
(45) Date of Patent: *Nov. 19, 2013

(54) METHODS, SYSTEMS, AND COMPUTER-READABLE-MEDIUMS FOR MANAGING ROLLOVER USAGE UNITS OF COMMUNICATION SERVICES

(75) Inventors: Cynthia Paige Amato, Duluth, GA (US); Audrey L Dibrell, Alpharetta, GA (US); Andre D Jarboe, Stone Mountain, GA (US); Andy Kilinski, Suwanee, GA (US); Robert Loadwick, Roswell, GA (US); George Mattackal, Alpharetta, GA (US); Pamela H Millikan, Suwanee, GA (US); Michael A Reagan, Roswell, GA (US); Pamela Roman, Birmingham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,388

(22) Filed: Aug. 22, 2012

(65) Prior Publication Data

US 2012/0315872 A1    Dec. 13, 2012

Related U.S. Application Data

(63) Continuation of application No. 12/643,763, filed on Dec. 21, 2009, now Pat. No. 8,275,354, which is a continuation of application No. 10/749,108, filed on Dec. 29, 2003, now Pat. No. 7,660,755.

(60) Provisional application No. 60/503,806, filed on Sep. 18, 2003.

(51) Int. Cl.
H04M 11/00    (2006.01)

(52) U.S. Cl.
USPC ............................ 455/408; 455/406; 455/407

(58) Field of Classification Search
USPC ............... 455/405, 406, 407, 408; 705/34, 37
See application file for complete search history.

(56) References Cited

U.S. PATENT DOCUMENTS 6,532,282 B1    3/2003    Plush et al.
6,552,282 B2 *  4/2003    Lewis ........................... 200/5 A
(Continued)

OTHER PUBLICATIONS

Office Action dated Apr. 30, 2008 for U.S. Appl. No. 10/749,108, 13 pages.
Office Action dated Nov. 24, 2008 for U.S. Appl. No. 10/749,108, 8 pages.

(Continued)

Primary Examiner — Patrick Edouard
Assistant Examiner — Myron K Wyche
(74) Attorney, Agent, or Firm — Turocy & Watson, LLP

(57) ABSTRACT

A rollover management system (RMS) receives and stores rollover data that includes subscriber identification and a balance of the rollover usage units that may be "rolled-over" to offset overage units used by a subscriber in excess of package plan usage units in a subsequent billing cycle. In response to receiving requests, the RMS presents rollover data elements to the requesting entities. The balance of the rollover usage units may be rolled over and measured in at least one of a plurality of billable units and may be shared by the subscriber's multiple communication services. The rollover usage units expire after a predetermined number of billing cycles where the predetermined number may vary between package plans. The RMS receives post-billing data elements to update the rollover data elements. The RMS is further operative to account for and present for review unbilled communication service usage to subscribers.

20 Claims, 6 Drawing Sheets

(56) References Cited

U.S. PATENT DOCUMENTS

| | | | |
|---|---|---|---|
| 7,457,777 B1* | 11/2008 | Barksdale et al. | 705/37 |
| 2004/0224661 A1* | 11/2004 | Pericas et al. | 455/406 |
| 2005/0182718 A1 | 8/2005 | Kortum et al. | |
| 2008/0045179 A1 | 2/2008 | Bekanich et al. | |

OTHER PUBLICATIONS

Office Action dated Jul. 17, 2009 for U.S. Appl. No. 10/749,108, 6 pages.

Office Action dated Oct. 11, 2011 for U.S. Appl. No. 12/643,763, 21 pages.

* cited by examiner

Rollover Billing Matrix - Mobile (803) 318-8293

| | 1<br>01-Dec | 2<br>02-Jan | 3<br>02-Feb | 4<br>02-Mar | 5<br>02-Apr | 6<br>02-May | 7<br>02-Jun | 8<br>02-Jul | 9<br>02-Aug | 10<br>02-Sep | 11<br>02-Oct | 12<br>02-Nov | 13<br>02-Dec |
|---|---|---|---|---|---|---|---|---|---|---|---|---|---|
| Price Plan Minutes: | 300 | 300 | 300 | 300 | 300 | 300 | 300 | 300 | 300 | 300 | 400 | 400 | 400 |
| Accumulated Rollover Minutes*: | 50 | 75 | 0 | 15 | -10 | 0 | 0 | 150 | 25 | 105 | 150 | 0 | 0 |
| Overage Minutes (Used): | 0 | 0 | -35 | 0 | 0 | -35 | -50 | 0 | 0 | 0 | 0 | -1 | 0 |
| Expired Rollover Minutes: | 0 | 0 | 0 | 0 | 0 | 0 | 0 | 0 | 0 | 0 | 0 | 19 | 75 |
| Adjusted Rollover Minutes: | 100 | 0 | 0 | 0 | 0 | 0 | 0 | 0 | 0 | 0 | 0 | 0 | 0 |

Previous Months' Balance

| | 1<br>01-Dec | 2<br>02-Jan | 3<br>02-Feb | 4<br>02-Mar | 5<br>02-Apr | 6<br>02-May | 7<br>02-Jun | 8<br>02-Jul | 9<br>02-Aug | 10<br>02-Sep | 11<br>02-Oct | 12<br>02-Nov | 13<br>02-Dec |
|---|---|---|---|---|---|---|---|---|---|---|---|---|---|
| 01-Dec | 0 | 0 | 0 | 0 | 0 | 0 | 0 | 0 | 0 | 0 | 0 | 0 | 0 |
| 02-Jan | 150 | 150 | 115 | 115 | 105 | 70 | 20 | 20 | 20 | 20 | 20 | 0 | 0 |
| 02-Feb | | 75 | 75 | 75 | 75 | 75 | 75 | 75 | 75 | 75 | 75 | 75 | 0 |
| 02-Mar | | | 0 | 0 | 0 | 0 | 0 | 0 | 0 | 0 | 0 | 0 | |
| 02-Apr | | | | 15 | 15 | 15 | 15 | 15 | 15 | 15 | 15 | 15 | 15 |
| 02-May | | | | | 0 | 0 | 0 | 0 | 0 | 0 | 0 | 0 | 0 |
| 02-Jun | | | | | | 0 | 0 | 0 | 0 | 0 | 0 | 0 | 0 |
| 02-Jul | | | | | | | | 150 | 150 | 150 | 150 | 150 | 150 |
| 02-Aug | | | | | | | | | 25 | 25 | 25 | 25 | 25 |
| 02-Sep | | | | | | | | | | 105 | 105 | 105 | 105 |
| 02-Oct | | | | | | | | | | | 150 | 150 | 150 |
| 02-Nov | | | | | | | | | | | | 0 | 0 |
| 02-Dec | | | | | | | | | | | | | 0 |
| Rollover Accumulated Account Balance: | 150 | 225 | 190 | 205 | 205 | 160 | 110 | 260 | 285 | 390 | 540 | 519 | 445 |

*Minutes not used from price plan package
Note: Shading indicates minutes expire if not used by end of 12th month Bill Cycle Date: 12/02/2002

Fig. 4

METHODS, SYSTEMS, AND COMPUTER-READABLE-MEDIUMS FOR MANAGING ROLLOVER USAGE UNITS OF COMMUNICATION SERVICES

CROSS REFERENCE TO RELATED APPLICATIONS

This application is a continuation of U.S. patent application Ser. No. 12/643,763 entitled "METHODS, SYSTEMS, AND COMPUTER-READABLE-MEDIUMS FOR MANAGING ROLLOVER USAGE UNITS OF COMMUNICATION SERVICES" filed Dec. 21, 2009, which is a continuation of U.S. patent application Ser. No. 10/749,108 (now U.S. Pat. No. 7,660,755) entitled "METHODS, SYSTEMS, AND COMPUTER-READABLE-MEDIUMS FOR MANAGING ROLLOVER USAGE UNITS OF COMMUNICATION SERVICES" filed Dec. 29, 2003, which claims priority to U.S. Provisional Appln. No. 60/503,806 entitled "METHODS, SYSTEMS, AND COMPUTER-READABLE-MEDIUMS FOR MANAGING ROLLOVER USAGE UNITS OF COMMUNICATION SERVICES" filed Sep. 18, 2003. The entireties of these application(s) and patent(s) are incorporated herein by reference.

FIELD OF INVENTION

The present invention relates generally to managing unbilled usage units of one or more communication services. More particularly, the present invention relates to managing the rollover of unused usage units represented by at least one of a plurality of billable units of measure for use in future billing cycles for various predetermined periods of time.

BACKGROUND OF INVENTION

Many users of wireless telecommunications services are familiar with purchasing an allotment of usage units in the form of time, for example usage minutes or package plan minutes per telecommunications billing cycle. Once package plan minutes are consumed during a billing cycle, users are typically charged an overage rate, for example 45 cents/min, for every minute of use beyond the package plan allotment for the billing cycle. Potential overage charges in some cases are offset by unused plan minutes called "rollover" usage units. Previous systems allow users to "rollover" unused minutes for use in subsequent usage periods or billing cycles. However previous rollover methods and systems are limited in providing rollover services to plan members and providing rollover data to plan members and customer service personnel.

Because previous systems and computer-readable-mediums are embedded in the billing systems of communications service providers, they are not accessible by multiple channels and are limited in flexibility and capability. For example, previous rollover systems offer billable units in minutes but not for other units of measure or for a variety of predetermined periods of time. Consequently, either all rollover minutes granted expire on the same date or the period of usage cannot be changed without the cumbersome changing of billing system parameters to extract and change the rollover data and code. Thus, although rollover usage units are offered in previous systems, they are not offered in a billable form other than minutes. Rollover units are also not offered in previous systems for a variety of usage periods such as 6, 12, and 24 billing cycles. Once a usage period is set in previous systems, the usage period is fixed for all customers or subscribers who use the rollover plan.

Furthermore, previous systems are not capable of having administrative or customer service personnel make adjustments to rollover usage units in the interest of marketing promotions or correcting errors. Also, subscribers cannot directly review their usage data and project a usage plan to avoid overage costs. Further, in order to make rollover information or data packets available to other channels for review in previous systems, cumbersome changing of billing system parameters to extract the rollover data is necessary. Thus, the speed to market of promotions regarding adjustments or grants of usage units is hindered. Additionally, previous systems are not easily equipped to support revenue deferrals beyond the current cycle based on unused rollover units. Also from a development stand point, previous systems embedded in a billing system cannot be developed in parallel with the billing system, thereby increasing development cost.

It is with respect to these and other considerations that the present invention has been made.

SUMMARY OF THE INVENTION

Embodiments of the present invention provide methods, systems, and computer-readable-mediums for managing billable units of usage that may be "rolled over" from a present usage period or billing cycle to subsequent billing cycles according to the subscriber's communication service package plan. According to one aspect of the invention, for each subscriber to the rollover feature of the communication services, a Rollover Management System (RMS) receives and stores rollover data that includes subscriber identification and a balance of the rollover usage units currently available to offset overage units used by a subscriber in excess of their package plan usage units available for a current billing cycle. According to this aspect the balance of rollover usage units available may include unused and unexpired plan package usage units rolled over from previous billing cycles.

When the RMS receives requests or schedules for presentation of rollover data elements that apply to subscribers being processed for a billing cycle, the rollover data elements are presented to the requesting entities. The rollover data elements include the subscriber identification and the balance of the rollover usage units currently available to offset the amount of overage units used in the current billing cycle. According to this aspect, the balance of the rollover usage units may be billed in a plurality of billable units. For example, the billable units for the rollover usage units may be a quantity of text messages sent and received, a quantity of memory consumed playing a video clip, a quantity of videos viewed, and/or more types of units. Also according to this aspect, the billable units of usage, for example 800 units per month, may be shared among multiple communication services, for example shared among a subscriber's wireless and local and long distance wireline services.

According to another aspect of the present invention the rollover usage units expire after a predetermined number of billing cycles being available to offset overage units used by the subscribers. The predetermined number of billing cycles may vary depending on the package plan of the subscriber. For example rollover usage units may have 6, 12, or 24 months of usage depending on a subscriber's individual package plan. The rollover usage units utilized to offset the overage units used are deducted from the oldest available and unexpired rollover usage units that are included in the balance of the rollover usage units available.

According to another aspect of the present invention, the RMS receives from the requesting and/or scheduling entities, post-billing data elements for each subscriber identified in the request or schedule of rollover data elements for subscribers being processed for a billing cycle. The post-billing data elements may include subscriber identification, rollover usage units accumulated during the current billing cycle, adjustments made to rollover usage units during the billing cycle, and overage units used during the current billing cycle. When the post-billing data elements are received, the RMS updates the rollover data elements with the post-billing data elements. Updating the rollover data elements may include adding the rollover usage units adjusted and accumulated during the billing cycle to the balance of rollover usage units available to offset the overage units used in the next billing cycle. The RMS is further operative to receive periodic updates during a single billing cycle to account for and present for review unbilled communication service usage. This aspect may help subscribers plan the use of their package plan and rollover usage units.

According to other aspects of the present invention, the RMS may be accessed by accounting systems. The accounting systems retrieve rollover data presented by the RMS such that the revenue associated with the rollover usage units accumulated during a current billing cycle may be deferred to one or more subsequent billing cycles until the rollover usage units become depleted or expire.

According to another aspect of the present invention, rollover usage data may be forwarded to the RMS from multiple communication service carriers. From the forwarded data, a rollover matrix is prepared showing the number of units of usage that are available for rolling over to a subsequent usage period. For example, a rollover matrix may illustrate the number of rollover minutes made available to a particular subscriber on a month-to-month basis over the course of one full year. The rollover matrix is capable of being accessed by one or more communication service carriers. For example, the RMS may present the rollover matrix to both wireline and wireless carriers to assist in accounting associated with rollover usage unit calling or text message plans. Additionally, the rollover matrix allows for the publication or presentation of rollover usage unit availability and usage to an Internet-based receiving device for review by the subscriber or a customer service representative. The RMS is further operative to account for and publish unbilled services usage for review by multiple channels, such as subscribers, customer service, and researchers.

These and other features and advantages, which characterize the present invention, will be apparent from a reading of the following detailed description and a review of the associated drawings. It is to be understood that both the foregoing general description and the following detail description are exemplary and explanatory only and are not restrictive of the invention as claimed.

BRIEF DESCRIPTION OF THE DRAWINGS

FIG. 4 is a sample interface display supported by rollover data elements presented in a rollover matrix from the rollover management system according to an embodiment of the present invention.

DETAILED DESCRIPTION

As described briefly above, embodiments of the present invention are directed to systems, methods, and computer-readable-mediums for managing the rollover of unbilled usage units for subscribers to a rollover feature of one or more communication services including wireless carriers and local and long distance wireline carriers. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
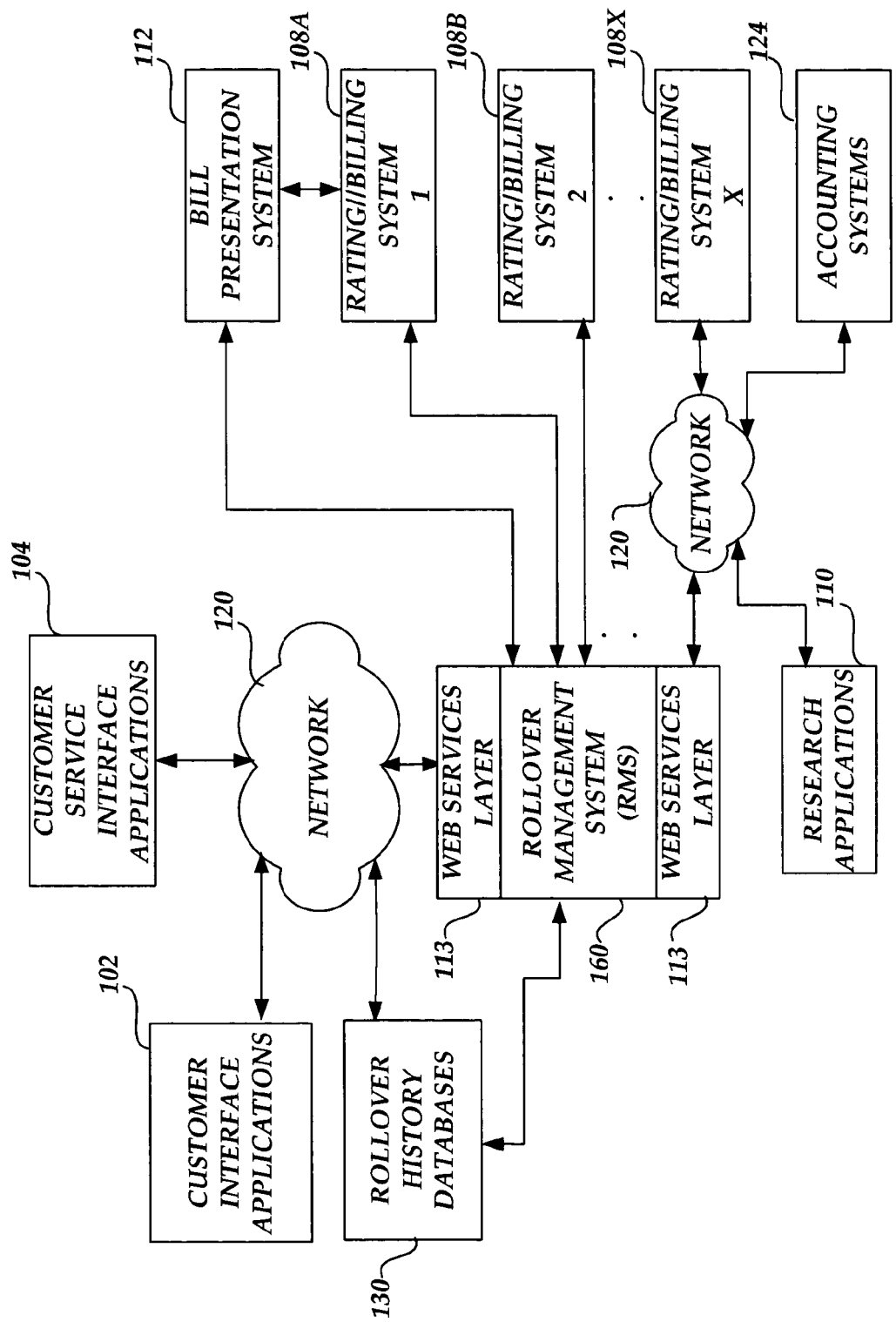
FIG. 1 is a simplified block diagram showing interaction between a rollover management system and a plurality of requesting entities according to an embodiment of the present invention.

FIG. 1 is a simplified block diagram showing interaction between a RMS 160 and a plurality of requesting entities according to embodiments of the present invention. The requesting entities include rating/billing systems 108A-108X of various communication services providers, a bill presentation system 112, accounting systems 124, subscriber or customer interface applications 102, customer service interface applications 104, rollover history databases of various service providers 130, and research applications 110. As will be described in greater detail below with reference to FIG. 3, the RMS 160 includes general purpose computing capability and software program applications operative to manage units of communication services usage, such as minutes of calling time, quantities of data downloaded, or quantities of memory consumed, that may be "rolled over" from one billing period or cycle to a subsequent billing cycle.

According to embodiments of the present invention the RMS 160 is employed for managing rollover usage units and related rollover data received from the rating/billing systems 108 and rollover history databases 130 of communication service providers such as wireless and wireline telecommunications service providers. According to embodiments of the present invention, rating/billing systems 108 of multiple communication services providers, such as a wireless and wireline communication services provider (wireline carrier) are illustrated for providing multiple communication services to subscribers such as wireless and local and long distance wireline services. As should be appreciated by those skilled in the art, the wireline carrier may operate a variety of wireline and digital data network communication services including conventional local and long distance wireline telephone services, Internet access services, digital data networks, wireline distributed computing networks, and other services. Also, as should be appreciated by those skilled in the art, the usage rating/billing systems 108 and rollover history databases 130 may be components of communication services systems illustrative of conventional cellular communications networks and other wireless communications operating systems such as satellite-based and Internet-based wireless communications systems, ultra wideband wireless communications, low and medium range wireless communications such as wireless fidelity (WIFI) systems and the like.

According to embodiments of the present invention, the rating/billing systems 108 may include one or more general purpose computing systems, memory and software application programs operative to receive communication data record information associated with communication services such as wireless and wireline communication operated via a wireless or wireline carrier and to prepare periodic billing for communications services associated with service call data records. For example, when a communication is sent or received via a communication services carrier, a call data record associated with the communication is received at the rating/billing system 108 of the carrier and is processed to determine whether or not a charge is associated with the communication data record. On a periodic basis, for example monthly, the rating/billing systems 108 of the carriers each generate a bill, or when shared generate a single bill, to subscribers of the carriers including charges for basic communication services subscribed to by the subscriber and charges associated with individual usage, if required.

Prior to the generation of a bill, the RMS 160 receives requests for rollover data from the rating/billing systems 108 of carriers that have subscribers to a rollover feature. In the alternative, a presentation schedule may be previously agreed upon such that the RMS 160 may present rollover data for subscribers without receiving requests. In response to the requests, the RMS 160 presents rollover data, including the balance of rollover usage units available for each subscriber identified in the requests, to the rating/billings systems 108 to assist the systems 108 in the calculation of the bill for the rollover feature subscribers. After the bill has been calculated, the RMS 160 updates the rollover data with post-billing data, including rollover usage unit adjustments and overages assessed, received from the rating/billing systems 108. The bill presentation system 112 produces the bill from data sent to it from the rating/billing system 108A. It should be appreciated that the RMS 160 may receive a direct request from the bill presentation system 112, and not only present rollover data for one rating/billing systems such as the rating/billing system 108A, but for multiple rating/billing systems 108A-108X such that the bill presentation system 112 may include billing data from other carriers in the produced bill.

The rating/billing systems 108 may communicate through a direct connection to the RMS 160 or via a network 120, such as the Intranet or the Internet through a web services layer 113. It should be appreciated that directly connected entities may also communicate through the web services layer 113 with the assistance of an intermediate application. The intermediate application interfaces with the web services layer 113 of the RMS 160. The web services layer 113 provides an access messaging protocol for the requesting entities and the RMS 160 to communicate with encoded information facilitating compatibility before receiving requests or sending responses over the network 120.

Other requesting entities may also interact with the RMS 160. For example the customer service interface applications 104 of the various communication services having the rollover feature may transmit requests to the RMS 160 for rollover data to respond to subscriber service needs. Furthermore, the RMS 160 may receive adjustments to rollover data elements from customer service interface applications 104. For example a customer service representative may grant additional rollover usage units to a subscriber in response to a dispute, a marketing promotion, or discounted resale of expired rollover units. The customer service interface applications may also communicate over the network 120 through the web services layer 113. Secondly, the RMS 160 may receive access requests from the customer interface applications 102. In response to the requests, the RMS 160 provides rollover data through the web services layer 113 and over the network 120 to the customer interface application 102 of the subscriber. For example, the customer interface application 102 of the subscriber could be a subscriber website or a hand held cellular device.

In response to a request to add new subscribers previously not associated with the RMS 160, the RMS 160 will receive the rollover history of the new subscribers from the rollover history databases 130. Furthermore, when the RMS 160 receives notice of a breakage terminating the subscription to the rollover feature, the RMS 160 will provide rollover data to the rollover history database 130. Research applications 110 may also request rollover data from the RMS 160 to analyze trends, conduct marketing research, or other business related research. Additionally the accounting systems 124 of the various communication services providers may request and receive rollover data to assist in the deferral of unbilled revenues to subsequent billing cycles. Additional details regarding interaction with the RMS 160 will be described below with respect to FIGS. 2-5B.

Figure 2:
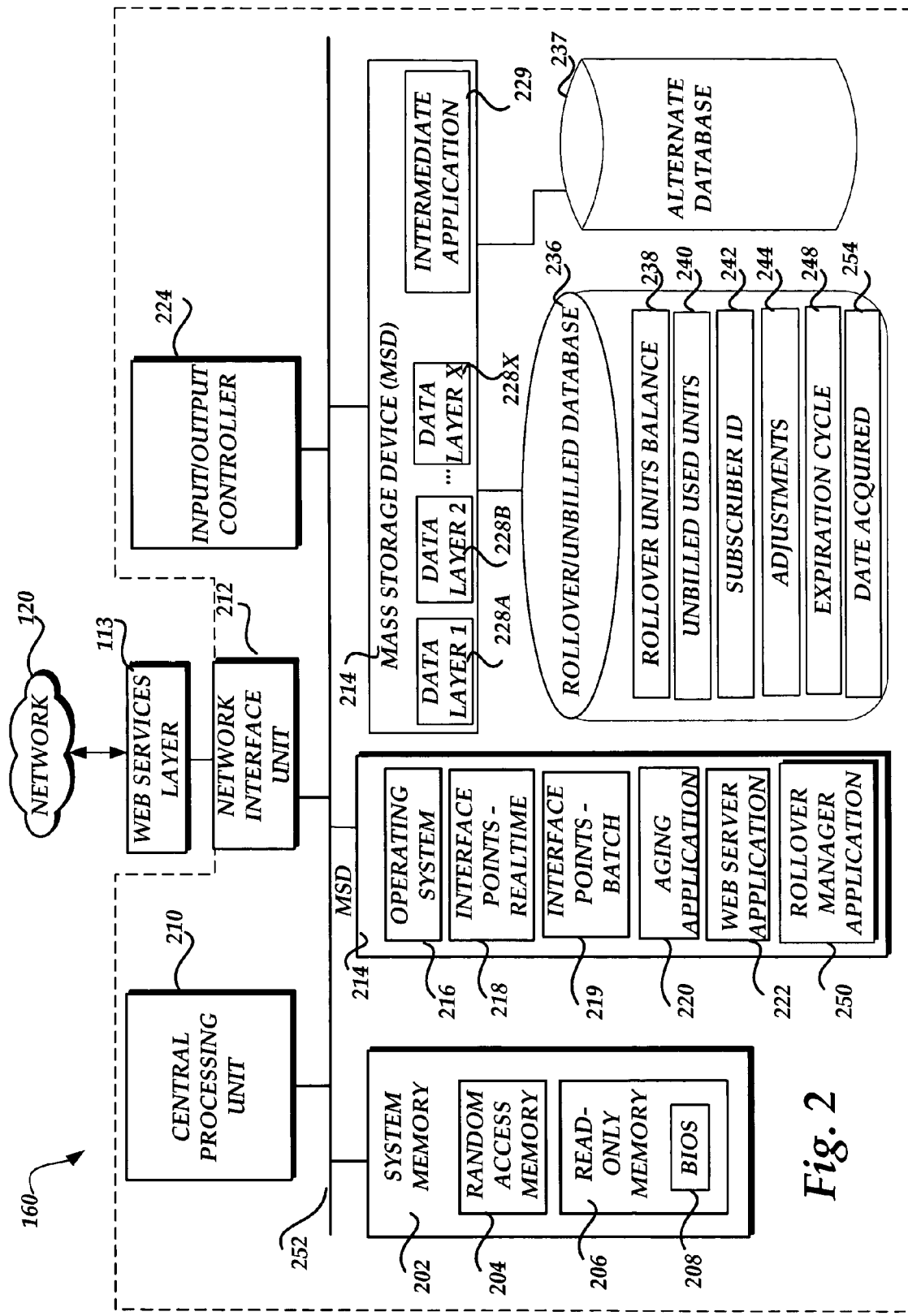
FIG. 2 is a block diagram of the rollover management system according to an embodiment of the present invention.

With reference to FIG. 2, the RMS 160 includes databases 236/237 where database 236 is a rollover/unbilled database and database 237 is an alternative database, a central processing unit (CPU) 210, a system memory 202, and a system bus 252 that couples the system memory 202 to the processing unit 210. The system memory 202 includes read-only memory (ROM) 206 and random access memory (RAM) 204. A basic input/output system 208 (BIOS), containing the basic routines that help to transfer information between elements within the RMS 160, such as during start-up, is stored in ROM 206. The RMS 160 further includes a mass storage device (MSD) 214 for storing an operating system 216, a web server application 222, and other application programs, such as real-time interface points 218 developed in JAVA from SUN MICROSYSTEMS of Mountain View, Calif. for interfacing with entities requesting access to the rollover data stored in the databases 236/237, and batch interface points 219 for interfacing with batch direct connections. The MSD 214 may also store the rollover manager application 250, an aging application 220, the intermediate application 229, and data layer access applications 228A-228X also developed in JAVA.

The MSD 214 is connected to the CPU 210 through a mass storage controller (not shown) connected to the system bus 252. The MSD 214 and its associated computer-readable media, provide non-volatile storage for the RMS 160. Although the description of computer-readable media contained herein refers to a mass storage device, such as a hard disk or CD-ROM drive, it should be appreciated by those skilled in the art that computer-readable media can be any available media that can be accessed by the CPU 210.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the CPU 210.

According to various embodiments of the invention, the RMS 160 operates in a networked environment as shown in FIG. 1 using logical connections to remote computers through the network 120, such as the Internet, an Intranet, or a local area network (LAN). The RMS 160 may connect to the network 120 through the web services layer 113 via a network interface unit 212 connected to the system bus 252. The web services layer 113 may utilize a simple object access protocol (SOAP) to encode the request for rollover data and the responses from the RMS 160 before receiving or sending information over the network 120. It should be appreciated that the network interface unit 212 may also be utilized to connect to other types of networks and remote computer systems. The RMS 160 may also include an input/output controller 224 for receiving and processing input from a number of devices, including a keyboard or mouse (not shown). Similarly, the input/output controller 224 may provide output to a display screen, a printer, or other type of output device.

Referring still to FIG. 2, the rollover manager application 250 in cooperation with the CPU 210 is operative to receive and respond to requests via the real-time interface points 218 in real-time and via the batch interface points 219 in batch communication. Once a request is received, the CPU 210 parses the request to determine the data being requested and then retrieves the data from the database 236 via the data layers 228A-228X. The data layers 228A-228X encapsulate the database and handle specific calls for rollover data, updates, and adjustments from the interface points 218/219. The data layers 228A-228X identify the type of database to which the request is compatible. For example the database 236 may be an ORACLE database from ORACLE CORPORATION of Redwood, Calif. If the requesting entity is not compatible with an ORACLE database, a different data layer 228X may be accessed to communicate with the alternative database 237, for example an INFORMIX database from IBM CORPORATION of White Plains, N.Y.

The databases 236/237 are operative to store rollover data elements for each subscriber including a rollover usage unit balance 238 available to offset overage units assessed in current, future, or past billing cycles. The databases 236/237 are further operative to store unbilled but used usage units 240 that are periodically updated during a billing cycle and a subscriber identification 242 such as a telephone number or network address. The databases 236/237 are still further operative to store usage unit adjustments 244 from customer service interface applications 104 and rating/billing systems 108 that add or deduct rollover usage units in response to errors or promotions. The databases 236/237 are still further operative to store a date when accumulations of rollover units are acquired 254 and an expiration cycle 248 of the subscriber's rollover usage units which may vary between subscribers depending on the subscriber's package plan. The expiration cycle 248 determines the number of billing cycles that unused and unbilled rollover usage units remain active before expiring.

The aging application 220 also interacts with the data layers 228A-X and is operative to age off the rollover data such that after a designated number of billing cycles of being stored, the aging application 220 will remove the aged data from the databases 236/237 and provide the aged data to a flat file archived to tape. Additionally, the aging application 220 will age off rollover data in response to a breakage notice after a designated period of time, for example 60 days. Breakage notices are initiated in response to a subscriber discontinuing or changing their rollover feature service. Additional details regarding the operation of the RMS 160 will be described below with respect to FIGS. 3-5B.

Figure 3:
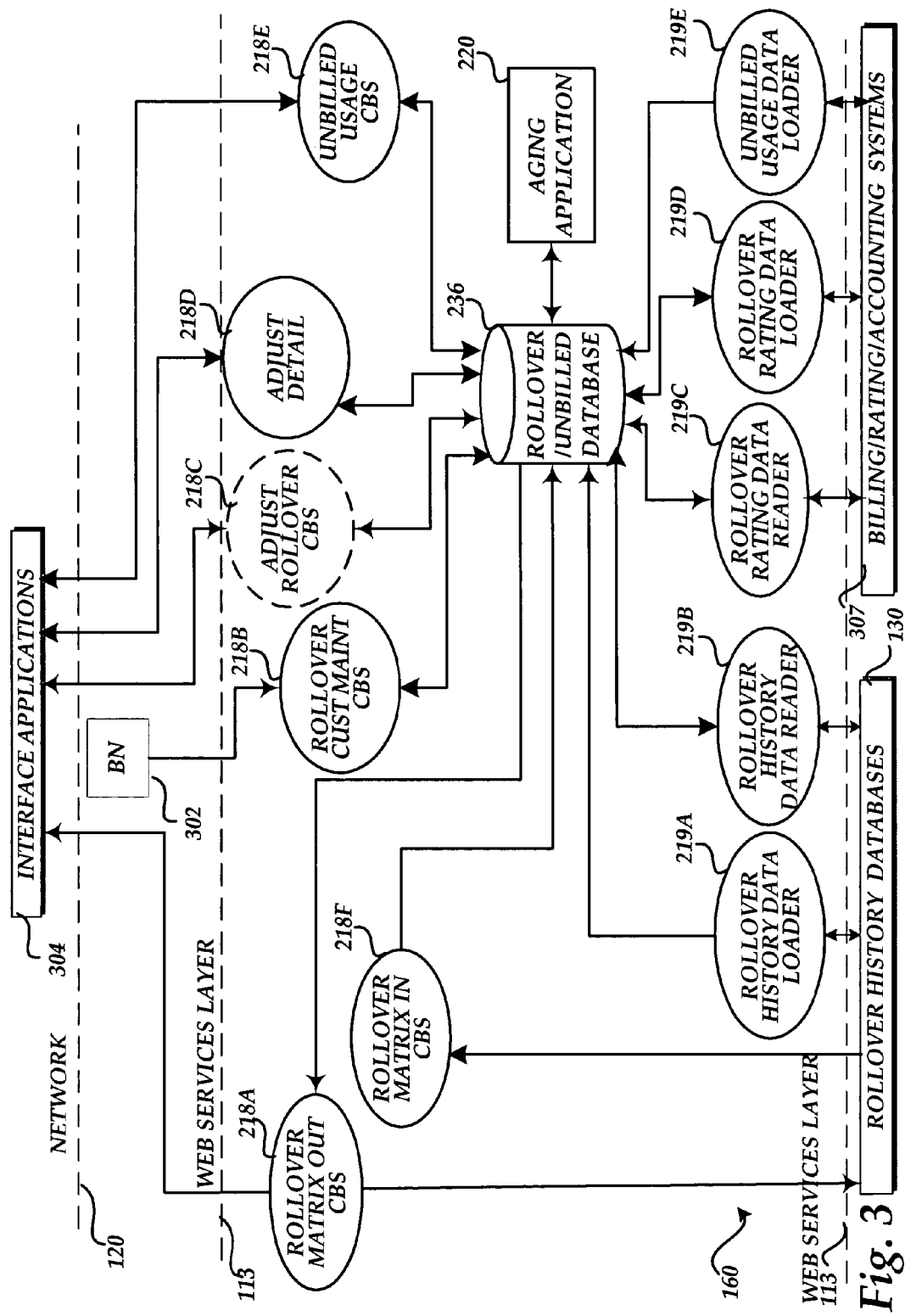
FIG. 3 is a simplified block diagram illustrating components of the rollover management system according to an embodiment of the present invention.
Figure 5A:
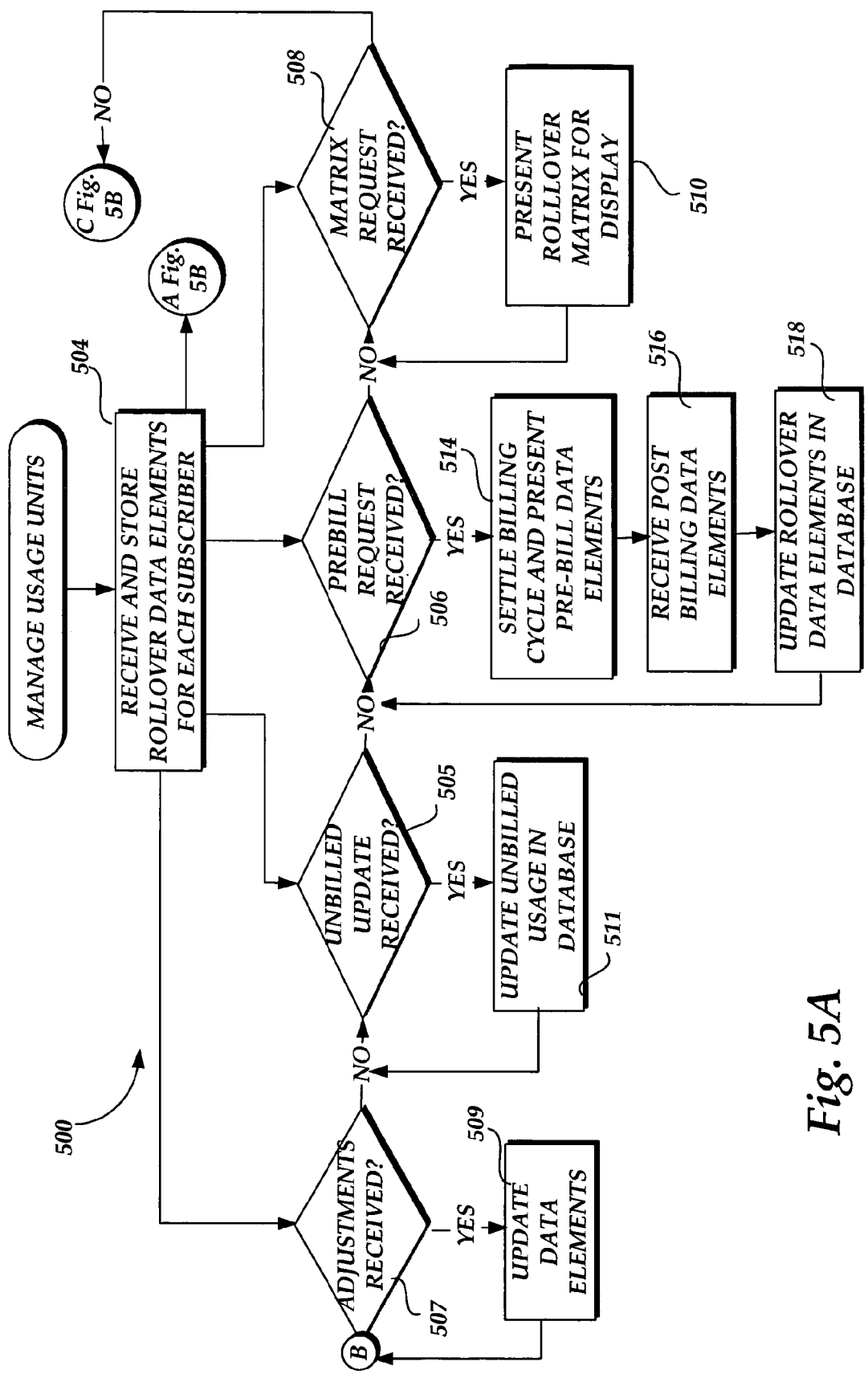
FIGS. 5A-5B illustrate a flow diagram showing an illustrative routine for managing rollover usage units of subscribers to rollover features of one or multiple communication services.
Figure 5B:
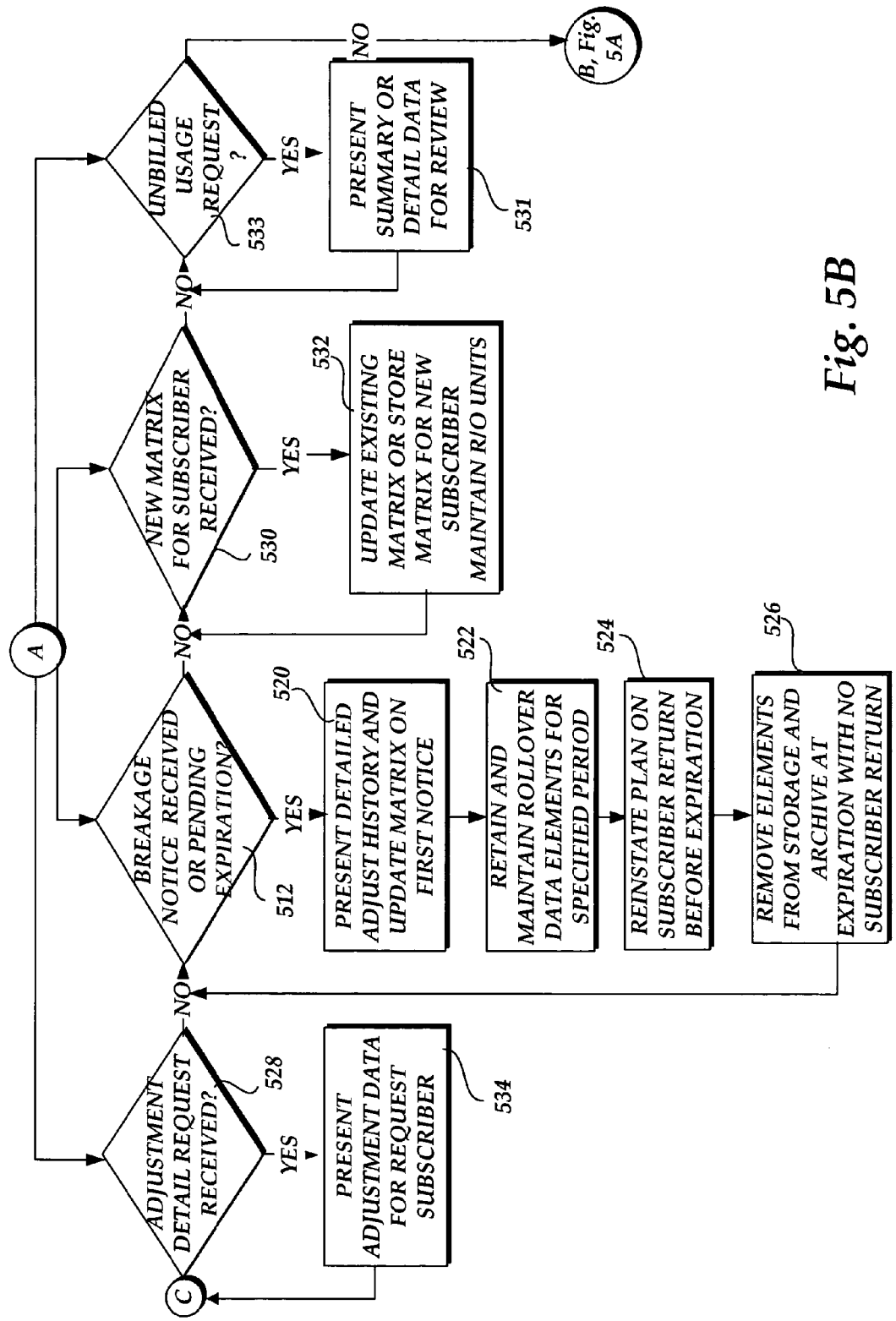

FIG. 3 is a simplified block diagram illustrating components of the RMS 160 according to embodiments of the present invention. As described briefly above with respect to FIGS. 1-2 a variety of requesting entities may interface with the RMS 160 via a web services layer 113 for real-time interaction or communication or via a direct connection utilizing periodic batch communication. The customer service interface application 104 and customer interface application 102 are represented in FIG. 3 by interface applications 304 and the rating/billing systems 108, bill presentation system 112, and accounting systems 124 are represented by the billing/rating/accounting systems 307. The interface applications 304 may request an aggregation of rollover data for subscribers to the rollover feature from the RMS 160 via the network 120, through the web services layer 113 and a rollover adjustment interface point 218C. A representative or customer may make this request by entering subscriber identification. In response to receiving the request, the RMS 160 parses the request and retrieves the requested data from the database 236. The RMS 160 then presents the data to the requesting interface application through a matrix out interface point 218A. It should be appreciated that the data is presented in a format such that a variety of interface applications having multiple displays may interface with the presented data.

As will be described in greater detail below, the rollover data is generated and stored in the database 236 based on pre-bill and post-billing interactions with the billing/rating/accounting systems 307 via a rollover rating data reader interface point 219C and a rollover rating data loader interface point 219D. The database 236 may also be populated by rollover history databases 130 of other communication services formerly not participating in services supported by the RMS 160, but subsequently adding the rollover feature with the option of sharing usage units between multiple communication services. The rollover data elements from the rollover history databases 130 may be sent to the database 236 via a rollover matrix at interface point 218F and a rollover history data loader interface point 219A. Rollover history may be returned to the rollover/unbilled history database 236 via the matrix out interface point 218A and a rollover history data reader interface point 219B. Pushes to the rollover/unbilled history database 236 may be in response to a breakage notification discontinuing or changing the package plan or rollover feature. Additional details regarding breakage notifications are described below.

Similarly, when a customer service representative makes an adjustment to the rollover usage units available to offset assessed overage units, the adjustment request also enters the RMS 160 via the rollover adjustment interface point 218C. The representative may make this request via the interface point 218C by entering the subscriber identification, the number of usage units adjusted, and the billing cycle or bucket to which the adjustment should apply. The RMS 160 then parses the adjustment request and makes the change in the database 236 and presents the adjusted change to the customer service interface via the interface points 218A or 218D.

The interface applications may also request the balance of usage units used but unbilled in the current billing cycle. The quantity of unbilled usage units is loaded into the database 236 on a periodic basis, for example daily, via the unbilled usage data loader interface point 219E. The unbilled usage updates may originate from one or more of the billing/rating/ accounting systems 307. This request is made via the rollover adjustment interface point 218E and the response is presented through the unbilled usage interface point 218E. Additionally, a summary of the adjustments made during a requested range of time for a requested subscriber may be requested by an interface application 304 via an adjustment detail interface point 218D and presented by the RMS 160 through the adjustment detail interface point 218D. As described below with respect to FIGS. 5A-5B the adjustment detail data presented at the adjustment detail interface point 218D for each adjustment made for the identified subscriber includes the amount of usage units adjusted, the reason for the adjustment, the date of the adjustment, and an identification of the user making the adjustment.

Similarly, a breakage notification 302 is sent to the RMS 160 when a subscriber discontinues their subscription to the rollover feature or changes their communication service plan. The breakage notification 302 may be sent to the RMS 160 from external systems with knowledge and responsibility for breakage. Breakage notification may be sent via the rollover customer maintenance interface 218B. As will be described below with respect to FIGS. 5A-5B, once the breakage notification 302 is received, the RMS 160 retrieves and presents detailed adjustment history and the rollover data elements, associated with the discontinuing or changing subscriber, are updated in the database 236. Additionally, the RMS 160 maintains and retains the rollover data associated with the account in the database 236 for a predetermined period of time, for example sixty days.

If the subscriber returns to the discontinued or previous plan before the predetermined period has expired, the RMS 160 reinstates the same plan as if the subscriber had not discontinued or changed plans. If the predetermined period of time expires prior to the subscriber's return, the rollover data elements for the discontinued plan are removed from the database 236 by the aging application 220 described above with respect to FIG. 2. The aging application 220 monitors the database 236 and removes the aged rollover data to a flat file and archives the data to tape upon the expiration of the breakage notification retention period. The aging application 220 also ages, removes, and archives rollover data from the database 236 that is stored beyond X billing cycles, where X is a predetermined number of billing cycles the rollover usage units of a subscriber may remain available to offset overage units prior to expiration. X may differ between subscribers depending on the communication plan of the subscriber.

FIG. 4 is a sample interface display 400 supported by data presented in a rollover matrix by the RMS 160 according to embodiments of the present invention. The rollover data elements are stored in the database 236 in the form of a rollover matrix. The data elements for each subscriber may include a date and time that the subscriber became a rollover customer (not shown), a date and a time that the subscriber ended as a rollover customer (not shown), and a current rollover status of the subscriber (not shown). The rollover data elements may also include for a current billing cycle 418 and for each of X previous billing cycles: a balance of rollover usage units 412, adjusted rollover usage units 410, and plan package usage units available 402 for use anytime during the billing cycle 418. The rollover data elements may still further include the overage units assessed 406, rollover usage units accumulated 404, and rollover usage units that actually expired 408. It should be appreciated that the rollover usage units projected to expire 413 if not used by the end of the current billing cycle 418 are also supported by the RMS 160 as shown by the shaded region over the expiration projections 413A and 413B. Additionally, it should be appreciated that the accumulated rollover usage units 404 for each billing cycle equate to the anytime package plan units that were not used in that billing cycle.

Furthermore, the subscriber rollover matrix of the RMS 160 supports the presentation of a date earned representing the various billing cycles, such as for a December 2001 cycle 414, and billing cycle buckets, such as bucket 416 for December 2001, for each balance of rollover usage units 412, each quantity or amount of adjusted rollover usage units 410, and each amount of package plan usage units 402 available. The rollover matrix also supports the presentation of each amount of overage units assessed or used 406, each amount of rollover usage units accumulated 404, and each amount of rollover usage units expired 408 for the date earned 414 and billing cycle bucket 416.

The rollover matrix example in FIG. 4 illustrates the rollover billing data presented for a subscriber to a rollover feature for a wireless mobile communication service having the subscriber identification 420. The billable units for the rollover usage units are minutes of use, the billing cycle is a monthly cycle, and X equals 12 cycles equating to the previous 12 months of rollover data. The RMS 160 retrieves and presents the rollover matrix to an interface application 304 in response to a request from a requesting entity, such as customer service or a subscriber, to review the matrix via a display or for customer service to make adjustments. The RMS 160 presents the rollover matrix via a web services layer 113 in real time or via a direct connection through batch communication. When adjustments are received from interface applications 304 or billing/rating/accounting systems 307, the RMS 160 updates the rollover matrix stored in the database 236.

As shown in FIG. 4, by way of example, the display 400 is for a subscriber initially having three hundred (300) package plan minutes allocated for use anytime during each billing cycle. In December, during the first billing cycle of the previous 12 billing cycles, the subscriber accumulated a balance of 150 rollover usage units represented in this embodiment by rollover minutes. One hundred (100) of the rollover minutes are adjusted rollover minutes 410 and fifty (50) minutes are accumulated rollover minutes 404. Both the adjusted 410 and accumulated 404 rollover minutes are placed in the December, or billing cycle 1, bucket 416. Adjustments may be acquired for a variety of reasons such as subscriber dispute resolution, marketing promotions, or the resale of expired minutes at a discount. Accumulated minutes are acquired during a billing cycle from the unused package plan minutes of the current billing cycle.

In January, during the second billing cycle of the previous 12 billing cycles, seventy-five (75) additional rollover minutes are accumulated and placed into a separate bucket 422. In February the subscriber goes over the allotted package plan minutes 402 by thirty-five (35) overage minutes 406. The overage of thirty-five (35) minutes is subtracted during the February billing cycle from the oldest aged bucket 416, leaving 115 rollover minutes remaining in the bucket 416 (150 minutes−35 minutes=115 minutes).

The other billing cycles progress similarly, and in September the subscriber changes the package plan minutes available anytime during a billing cycle to 400 anytime minutes. The process continues accordingly. Notably in November, after 12 billing cycles of being available to offset overage units, rollover units begin to expire as denoted by the expiration projection 413A in October. It should be appreciated that although the projection denotes twenty (20) minutes will expire if not used, the expired rollover minutes 408 for the November billing cycle is actually nineteen (19) because one (1) rollover minute scheduled to expire offset the overage units 406 used in November. The rollover data for November indicates that the subscriber used all four hundred (400) of the plan package minutes 402, plus one (1) overage minute 406. The rollover minutes from the oldest aged bucket 416 expire after 12 billing cycles. It should be appreciated that a subscriber may extend the expiration date of rollover usage units at a discounted price. Additional rollover minutes from the aged buckets remain and expire according to the same process as the billing cycles progress. Additional details regarding the rollover management process will be described below with respect to FIGS. 5A-5B.

Referring now to FIGS. 1-4 and 5A-5B a flow diagram showing an illustrative routine 500 for managing rollover usage units of subscribers to rollover features of one or multiple communication services according to an embodiment of the present invention will be described. The routine 500 begins at operation 504 where for each subscriber to the rollover feature of the communication services, the RMS 160 receives and stores rollover data elements. The rollover data elements are received from the rating/billing systems 108 and the rollover history database 130 of previous rollover plans. The rollover data elements may include subscriber identification and a balance of the rollover usage units currently available to offset the overage units used or assessed in excess of the package plan usage units available to the subscriber for the current billing cycle. The balance of the rollover usage units currently available may include the unused and unexpired package plan usage units rolled over from at least one previous billing cycle and all usage unit adjustments added and unexpired in previous billing cycles.

The rollover data elements may also include the adjusted rollover usage units to be added to or deducted from the balance of rollover usage units made available to offset the overage units used in the current billing cycle. It should be appreciated that the rollover data elements for each subscriber may also include the date earned 414 for each accumulation of rollover usage units 404 and adjusted rollover usage units 410. The rollover usage units 404 and the adjusted rollover usage units 410 added to the rollover usage units expire after X billing cycles of being available to offset an amount of overage units used. X is a predetermined number that may vary depending on the package plan of the subscriber. Additionally the rollover data elements may also include the rollover usage units that will expire at the end of the current billing cycle when not applied to offset overage units used in the current billing cycle 418. When the rollover usage units are utilized to offset the overage units used, they are deducted from the oldest available and unexpired rollover usage units that are available to offset the overage units used in the current billing cycle.

Next the routine 500 continues to operation 505 where a determination is made as to whether any unbilled usage updates for subscribers to the rollover feature have been received. Unbilled usage updates may be received in batch files via an unbilled usage data loader interface 219E. In the alternative, it should be appreciated that the update may also be received in real-time via the web services layer 113. If an unbilled update has been received, the routine 500 continues from operation 505 to operation 511 where the rollover/unbilled database 236 is updated with the current unbilled used usage units 240 for identified subscribers. The amount of unbilled but used usage units 240 is updated periodically, such as daily, during a current billing cycle by batch or real-time updates sent by the rating/billing systems 108 of communication services having subscribers to the rollover feature. The unbilled used usage units 240 may be retrieved by subscribers and reviewed to project or plan the use of available package plan and rollover usage units. For example, a subscriber or customer service representative wanting to keep a subscriber from paying extra for overage units may request a review of the unbilled used usage units 240 for the current billing cycle and in response the RMS 160 will present the current unbilled used usage units via the unbilled usage interface point 218E. Having access to the current unbilled usage allows the subscriber to plan the use of their package plan and rollover usage units to avoid overage surcharges. If an unbilled update has not been received, the routine 500 continues from operation 505 to operation 506 described below.

At operation 506 a determination is made as to whether a request for rollover data of identified subscribers being processed for billing has been received. The determination of this request for rollover data may be detected by parsing the request. These requests originate from the rating/billing systems 108 at the end of a billing cycle. If a pre-bill request for rollover data has been received the routine 500 continues to operation 514. At operation 514 the RMS 160 closes the rollover data elements of the billing cycle bucket for the current billing cycle, establishes a new billing cycle bucket for a next billing cycle, retrieves the rollover data elements for the subscribers identified in the request from the database 236, and presents the rollover data elements to the interface of the requesting entities for each identified subscriber via the rollover rating data reader interface 219C. Each accumulation of the accumulated rollover usage units 404 and/or the adjusted rollover usage units 410 may be associated in the database 236 with a rollover billing cycle bucket representing the billing cycle in which the accumulated rollover usage units and/or the adjusted rollover usage units are earned.

The rollover data elements may include the subscriber identification 242 and the balance of the rollover units balance 238 currently available to offset the overage units used in the current billing cycle. The rollover usage units may be measured in at least one of a plurality of billable units depending on the communication services being billed. For example, the billable units accounting for the rollover usage units may be measured in a quantity of communication events or transactions such as text messages sent, a quantity of memory used such as megabytes downloaded, a quantity of data transmitted and/or received such as kilobytes of data transmitted and/or received, a quantity of time such as minutes of use, a quantity of communication sent and/or received such as video clips sent or received, and a quantity of communication viewed such as videos viewed.

Furthermore, for subscribers to multiple communication services the rolled over billable units measured for a first communication service may, if necessary, be converted into rolled over billable units for a second communication service. For example, a subscriber to both wireless and wireline communication services may share rollover usage units among both communication services. Minutes of use for wireless and wireline phone calls will not require a conversion, however converting rollover minutes of use to a number of text message transmittals and/or receipts will permit a balance of rollover usage units to be used for both phone calls and wireless text messaging.

The rollover data elements may also include the usage units adjustments added or deducted since the last billing cycle and the number of rollover usage units due to expire 413 if not used to offset overage units used in the current billing cycle where the rollover data also includes the date earned 414 or billing cycle when each accumulation of rollover usage units was earned. The date on which the accumulation of rollover usage units is earned may be represented by a billing cycle bucket.

The routine 500 then continues from operation 514 to operation 516 where post-billing data elements are received for the subscribers being processed. The post-billing data elements may include subscriber identification, rollover usage units accumulated during the current billing cycle that includes the unused package plan usage units for the current billing cycle, and the overage units used during the current billing cycle. The post-billing data elements may further include the expired rollover units 408 for the end of the current billing cycle and the package plan units 402 available for the current billing cycle and the next billing cycle. Next, in response to receiving the post-billing data elements, the routine 500 continues to operation 518 where the rollover data elements are updated with the post-billing data elements.

Updating the rollover data elements includes adding the accumulated rollover usage units 404 during the current billing cycle to a balance of rollover usage units 412 available to offset overage units used in the next billing cycle and storing the date or billing cycle that the accumulated rollover units were earned. Updating the rollover data may also include applying any accumulated rollover usage units 404 and adjusted rollover usage units 410 earned in the current billing cycle to the billing cycle bucket for the current billing cycle. Updates may further include deducting any rollover usage units and any adjusted rollover usage units used to offset the used overage units 406 in the current billing cycle from the oldest rollover billing cycle bucket 416 still having any rollover usage units that are unexpired. It should also be appreciated that when the oldest rollover billing cycle bucket is depleted, updates include deducting any used rollover usage units to offset the used overage units in the current billing cycle 418 from the next oldest rollover billing cycle bucket 422 still having rollover usage units that are unexpired. Additionally, updating the rollover data elements for each subscriber in the database 236 may further include populating the used overage units 406 in the current billing cycle bucket and the accumulated rollover usage units 404 in the current billing cycle bucket. Updates also include populating the expired rollover usage units 408 in the current billing cycle bucket and the package plan usage units 402 available in the current billing cycle bucket and the next billing cycle bucket.

It should be appreciated that the accounting systems 124 of the participating communication service providers may send requests to the RMS 160 for the accumulated rollover units earned during a specified billing cycle for specified subscribers. The RMS 160 will retrieve the accumulated units and present the data to the accounting systems 124. The accounting systems 124 may then defer the revenue associated with the amount of rollover usage units accumulated during a billing cycle to subsequent billing cycles until the rollover usage units become depleted or expire.

After updating the rollover data elements, the routine 500 continues from operation 518 to operation 505 described above. If at operation 506, no requests are received, the routine 500 continues from operation 506 to operation 508. At operation 508 the RMS 160 determines whether a request for a rollover matrix has been received. According to embodiments of the present invention, a rollover matrix is prepared and maintained by the RMS 160 and the rollover matrix contains rollover units data for a set period of time, such as rollover minutes available for every month of one year. The data maintained in the rollover matrix is utilized for calculation, display and billing of rollover minutes. The RMS 160 presents the rollover matrix to the communication service carriers to allow all carriers to synchronize information associated with rollover usage units. A request for a rollover matrix may include subscriber identification such as an account number or communication device number. If a rollover matrix request has been received, the routine 500 continues to operation 510 where the rollover matrix is presented to the requesting entity via the rollover matrix out interface point 218A. As described above with respect to FIG. 4, the rollover matrix supports displays of a plurality of interface applications that display multiple rollover data parameters over X billing cycles to requesting entities.

Next the routine 500 continues to operation 507 where the RMS 160 determines whether an adjustment to rollover usage units has been received. This adjustment may be from a customer service representative in response to a subscriber dispute or a marketing promotion. If no adjustments have been received, the routine 500 continues to operation 505 described above. If an adjustment has been received, the routine 500 continues to operation 509 where the RMS 160 executes an update accounting for the adjustment in the database 236. The routine 500 then continues from operation 509 to operation 505 described above.

If at operation 508 a request for a rollover matrix has not been received, the routine 500 continues to operation 512 where the RMS 160 determines whether a breakage notification 302 has been received or is pending expiration. As described above with respect to FIG. 3, breakage notifications 302 discontinuing subscriptions may be received via the rollover customer maintenance interface point 218B. If a breakage notification 302 has been received or one is pending expiration, the routine 500 continues to operation 520 where the RMS 160 presents a detailed adjustment history of the discontinued subscriber and updates the rollover matrix when the breakage notification 302 is first received. Updates to the rollover matrix in response to breakage notifications may include updating the rollover status of the subscriber, the rollover subscription end date, and the end date of subscriptions to shared communication services if applicable. The routine 500 then continues to operation 522 where the rollover matrix data for the subscriber is still retained and updated for a specified period, such as two billing cycles or sixty days. The routine 500 then continues to operation 524 where the RMS 160 reinstates the discontinued subscription when the subscriber returns before the specified period has expired. The routine 500 then continues to operation 526 where the RMS 160 removes the rollover data elements for the discontinued subscriber from the database 236 and archives the data elements to tape when the specified period has expired without the subscriber returning for reinstatement. The routine 500 then continues to operation 505 described above. If at operation 512, no breakage notification is received or pending expiration, the routine 500 continues to operation 528 where the RMS 160 determines whether a request for adjustment detail data elements has been received.

A request for adjustment details may include subscriber identification and a date range of adjustment coverage for the request. If a request for adjustment details has been received, the routine 500 continues to operation 534 where the RMS 160 presents adjustment detail data elements to the requesting entity via the adjustment detail interface point 218D. The adjustment detail includes data elements for each adjustment occurring during the specified date range. The data elements may include the quantity of usage units adjusted, the reason for the adjustment, the date of the adjustment, and an identification of the user that made the adjustment. The reasons for the adjustments represented by the reason code may include an error correction, a dispute resolution, a resale of expired rollover units at a reduced rate, or a marketing promotion. The routine 500 then continues to operation 505 described above. If at operation 528, no request for adjustment detail is received, the routine 500 continues from operation 528 to operation 530.

At operation 530, the RMS 160 determines whether a new matrix for a subscriber has been received. This may occur when a subscriber changes package plans such as combining communication services for example wireless and wireline usage units. It may also occur when a customer subscribes to the rollover feature for the first time. The new matrix may be received via the rollover matrix at interface point 218F. If a new matrix has been received, the routine 500 continues to operation 532 where either the RMS 160 executes an update to an existing matrix for an existing subscriber with the new matrix or stores a new matrix for a new or inactive subscriber. The routine 500 then continues to operation 505 described above. If a new matrix has not been received, the routine 500 continues from operation 530 to operation 533.

At operation 533 the RMS 160 determines whether a request for unbilled usage has been received. If a request has been received, the routine 500 continues to operation 531 where either the RMS 160 presents a summary of unbilled usage or detailed data regarding unbilled usage to the requesting entity via the unbilled usage interface point 218E. The detailed data includes subscriber identification, the date, the time of communication, the duration of communication, and the communication device identification consuming the unbilled usage units. This may be helpful in dispute resolution with customer service and budgeting usage units. After presenting the unbilled usage data, the routine 500 then continues from operation 531 to operation 505 described above. If no request is received the routine 500 continues to operation 507 described above.

As described herein, a RMS is provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A system, comprising:
    a memory to store computer-executable instructions; and
    a processor, communicatively coupled to the memory, which facilitates execution of the computer-executable instructions to perform operations comprising:
    receiving a rollover data element associated with a subscription to a communication service, wherein the rollover data element represents a set of rollover usage units accumulated before a current billing cycle of the subscription and wherein the rollover data element comprises information representing respective dates of accumulation of the set of rollover usage units;
    offsetting an overage unit associated with the subscription in excess of a predetermined quantity of package plan usage units for the current billing cycle with a rollover usage unit of the set of rollover usage units, wherein the rollover usage unit with an oldest date of accumulation is selected from the set of rollover usage units to offset the overage unit; and
    removing an expired rollover usage unit of the set of rollover usage units after a predetermined number of billing cycles.

2. The system of claim 1, wherein the operations further comprise:
    receiving a post-billing data element associated with the subscription; and
    updating a balance of rollover usage units based on the post-billing data element.

3. The system of claim 1, wherein the set of rollover usage units expire after a predetermined length of time.

4. The system of claim 1, wherein the operations further comprise:
    deferring revenue associated with the set of rollover usage units accumulated during the current billing cycle to a subsequent billing cycle until available rollover usage units of the set of rollover usage units are depleted.

5. The system of claim 1, wherein the operations further comprise:
    receiving an adjusted rollover usage unit associated with the subscription; and
    adding the adjusted rollover usage unit to rollover usage units of the set of rollover usage units available to offset overage units in response to reception of the adjusted rollover usage unit.

6. The system of claim 1, wherein the set of rollover usage units are measured in a predefined type of billable unit.

7. The system of claim 6, wherein the operations further comprise:
    converting the rollover usage unit of a first billable unit type associated with a first communication service to a second billable unit type associated with a second communication service.

8. The system of claim 1, wherein the operations further comprise:
    adjusting a balance of rollover usage units of the set of rollover usage units available to offset overage units in response to a modification of the subscription.

9. The system of claim 1, wherein the rollover data element comprises data representative of a rollover history associated with the subscription.

10. The system of claim 9, wherein the operations further comprise:
    analyzing a trend associated with the rollover history; and
    modifying the subscription based on the trend.

11. A method, comprising:
    receiving, by a system comprising a processor, a rollover data element associated with a subscription to a communication service, wherein the rollover data element represents a set of unused usage units rolled over from a previous billing cycle of the subscription previous to a current billing cycle;
    determining, by the system, a date of accumulation for each of the unused usage units in the set of unused usage units based on analyzing the rollover data element;
    offsetting, by the system, a usage unit for the current billing cycle in excess of a predetermined quantity of package plan usage units with an unused usage unit from the set of unused usage units, wherein the unused usage unit with an oldest date of accumulation is selected from the set of unused usage units to offset the usage unit; and
    expiring, by the system, an old unused usage unit of the set of unused usage units after a predetermined number of billing cycles.

12. The method of claim 11, further comprising:
    receiving, by the system, a post-billing data element associated with the subscription to the communication service; and
    updating, by the system, the rollover data element with the post-billing data element.

13. The method of claim 11, wherein the expiring the old unused usage unit further comprises removing the old unused usage unit from the set of unused usage units after a predetermined length of time.

14. The method of claim 11, further comprising:
deferring, by the system, revenue associated with the set of unused usage units accumulated during the current billing cycle to a subsequent billing cycle until unused usage units of the set of unused usage units expire.

15. The method of claim 11, further comprising:
receiving, by the system, an adjusted rollover data element associated with the subscription; and
adjusting, by the system, a balance of unused usage units of the set of unused usage units based on the adjusted rollover data element.

16. The method of claim 11, further comprising:
measuring, by the system, the unused usage unit in a billable unit type.

17. The method of claim 16, further comprising:
converting, by the system, unused usage units of the set of unused usage units of a first billable unit type associated with a first communication service to a second billable unit type associated with a second communication service.

18. The method of claim 11, further comprising:
adjusting, by the system, a balance of unused usage units of the set of unused usage units available to offset the usage unit in response to a modification of the subscription.

19. A tangible computer-readable storage device comprising computer-executable instructions that, in response to execution, cause a computing device comprising a processor to perform operations, comprising:
receiving a rollover data element associated with a subscription to a communication service, wherein the rollover data element represents a set of rollover usage units accumulated before a current billing cycle of the subscription;
analyzing the rollover data element;
based on the analyzing, determining a date of accumulation for each of the rollover usage units in the set of rollover usage units; and
deducting an overage unit used by the subscription in excess of a predetermined quantity of package plan usage units for the current billing cycle with a rollover usage unit from the set of rollover usage units based on a corresponding date of accumulation, comprising deducting the overage unit from a balance of the set of rollover usage units in a descending order starting with the rollover usage unit associated with an oldest date of accumulation.

20. The tangible computer-readable storage device of claim 19, wherein the operations further comprise:
receiving an adjusted rollover usage unit associated with the subscription; and
updating the balance of rollover usage units of the set of rollover usage units available to offset overage units in response to receiving the adjusted rollover usage unit.

* * * * *